(12) United States Patent
Ali et al.

(10) Patent No.: US 9,063,792 B2
(45) Date of Patent: Jun. 23, 2015

(54) MANAGING MOBILE EXECUTION ENVIRONMENTS

(75) Inventors: Rashad Mohammad Ali, Plano, TX (US); Alexander G. Garbuz, Plano, TX (US)

(73) Assignee: Entrata Systems, Inc., Plano, TX (US)

( * ) Notice: Subject to any disclaimer, the term of this patent is extended or adjusted under 35 U.S.C. 154(b) by 0 days.

(21) Appl. No.: 13/450,157

(22) Filed: Apr. 18, 2012

(65) Prior Publication Data

US 2013/0283298 A1    Oct. 24, 2013

(51) Int. Cl.
*G06F 3/00* (2006.01)
*G06F 9/44* (2006.01)
*G06F 9/46* (2006.01)
*G06F 13/00* (2006.01)
*G06F 9/50* (2006.01)

(52) U.S. Cl.
CPC .................................... *G06F 9/5077* (2013.01)

(58) Field of Classification Search
None
See application file for complete search history.

(56) References Cited

U.S. PATENT DOCUMENTS

| | | | |
|---|---|---|---|
| 2006/0123061 A1* | 6/2006 | Puustinen | 707/200 |
| 2006/0218536 A1* | 9/2006 | Kirilline et al. | 717/127 |
| 2009/0055749 A1* | 2/2009 | Chatterjee et al. | 715/738 |
| 2009/0089781 A1* | 4/2009 | Shingai et al. | 718/1 |
| 2010/0146507 A1* | 6/2010 | Kang et al. | 718/1 |
| 2010/0169537 A1* | 7/2010 | Nelson | 711/6 |
| 2011/0244440 A1* | 10/2011 | Saxon et al. | 434/362 |
| 2012/0216031 A1* | 8/2012 | Baumgarth et al. | 713/100 |

* cited by examiner

*Primary Examiner* — Craig Dorais
(74) *Attorney, Agent, or Firm* — Fish & Richardson P.C.

(57) ABSTRACT

In some implementations, a method includes receiving, by a mobile device, a request to switch from a first mobile execution environment to a second mobile execution environment. The first mobile execution environment runs on a same operating system, and the second execution environment runs on the same operating system. In response to the request, the mobile device switches from the first mobile execution environment to the second execution environment, wherein the second mobile execution environment has at least one of a different control policy or a different application framework than the first mobile execution environment.

21 Claims, 18 Drawing Sheets

MANAGING MOBILE EXECUTION ENVIRONMENTS

TECHNICAL FIELD

This invention relates to mobile devices and, more particularly, to managing mobile execution environments.

BACKGROUND

Services over the Internet, cable, satellite, and broadcast continues to improve every day. Users may also have access to other services such as maps, shopping links, images, eBook, Social Networks, Gaming, Banking, Medical, Health Care, blogs, local search, television guides, on-demand video, satellite images, group discussions, hosted content, and e-mail. While many of the services are free to users, a user may only access these services using hardware manufactured by the service provider.

SUMMARY

In some implementations, a method includes receiving, by a mobile device, a request to switch from a first mobile execution environment to a second mobile execution environment. The first mobile execution environment runs on a same operating system, and the second execution environment runs on the same operating system. In response to the request, the mobile device switches from the first mobile execution environment to the second execution environment, wherein the second mobile execution environment has at least one of a different control policy or a different application framework than the first mobile execution environment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
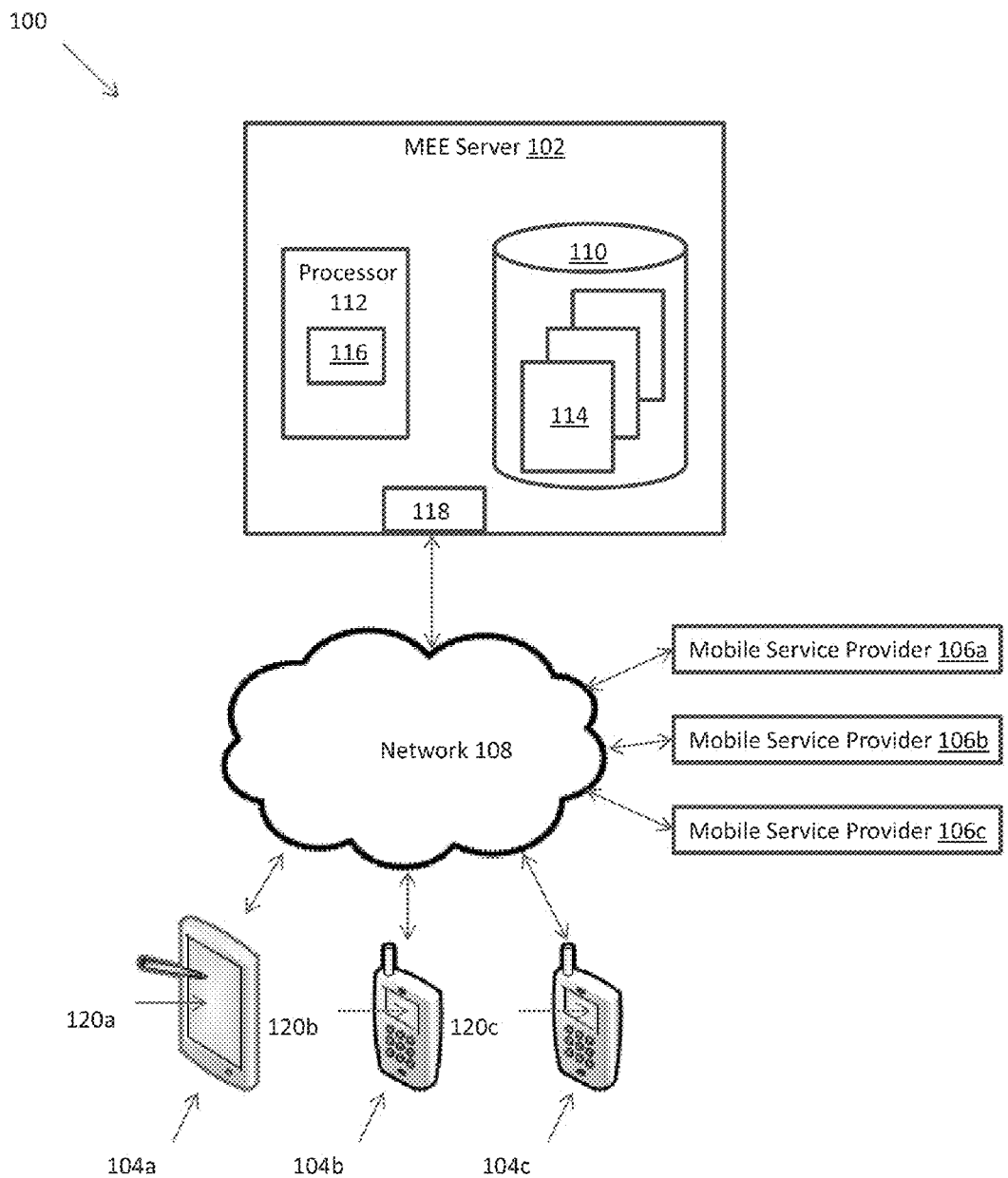
FIG. 1 is a block diagram illustrating an example system for managing mobile execution environments.

FIG. 1 illustrates an example system 100 for managing Mobile Execution Environments (MEEs) in user devices. For example, the system 100 may download one or more MEEs to a user device to grant access to services (e.g., multimedia, content). The current mobile operating systems (mobile OS), further will be referred to as a Mobile Computing Environment (MCE), can be divided into three major layers: a) Operating System (e.g. Android is using Linux OS, iOS is derived from Unix based OS), b) MCE Framework and Core Services that usually consist of libraries and background processes that are not visible to users (e.g. Android: Activity Manager, Dalvik Virtual Machine, Window Manager, Binder based inter-process communication, miscellaneous libraries etc), this layer that defines an execution environment for applications (e.g., virtual machine in Android, Objective-C in Apple iOS) and a set of rules that applications follow to run on MCE, and c) MEE that consist of additional pre-installed Apps to extend services for an user (e.g., Appstore/MarketPlace App to install additional Apps, Home Screen for Android, Camera App, Media services App). MCE Framework sometimes with a cooperation with App services from MEE (example AppStore controls download policies) defines a set of rules that may include one or more of the following: security properties of applications controlling which resources are available to applications from underlying hardware and/or operating system and/or from other applications and services running inside the MCE; access to device resources such as storage, sensors, and others; inter-applications Application Program Interfaces (APIs); access to window/graphical subsystem of the device; and others. The MEE may also provide functionality to manage applications that include downloading, installing, and/or removing applications from a cloud based store/repository. The MEE layer may also include additional services for applications such as an advertisement framework, payment framework, gaming and social networking framework. In some implementations, the system 100 may execute one or more of the following: identify MEEs available to the system 100; identify criteria for evaluating requests for MEEs; receive requests from user devices for available MEEs; download MEEs to user devices; receive updates to MEEs from mobile service providers; transmit updates to user devices; remove MEEs from user devices in response to one or more events; and/or others. By managing downloadable MEEs, the system 100 may enable one or more of the following: provide a light-weight virtualization of a mobile device that virtually shall not impact performance of the device including battery life; provide a time-shared access service to users such that users are not using the two or more operating systems simultaneously; provide a multi-service (or multi-system) functionality that allows a mobile device to be served by different MEE vendors; provide an ability for a user to switch between MEE providers and manage additional users; provide a mechanism/method to manage MEEs from different vendors; and/or others.

At a high level, the system 100 includes an MEE server 102, user devices 104a-c, and mobile service providers 106a-c coupled through a network 108. The MEE server 102 is an electronic device operable to download, install, remove, update or otherwise manage MEEs for the user devices 104a-c. The server 102 includes memory 110 and a processor 112. The memory 110 stores MEEs 114 for enabling different execution environments on the user devices 104a-c. The processor 110 includes a request engine 116 configured to receive requests for MEEs 114 from the user devices 104a-c and install the requested MEEs 114 on the user devices 104a-c. The user devices 104a-c are electronic devices owned, operated or otherwise associated with an individual and operable to receive and/or transmit information in the system 100. The mobile-service providers 106a-c provide services to user devices 104a-c executing associated MEEs. At a high level of operation, the request engine 116 receives a request for an MEE 114 from a user device 104. The request engine 116 verifies (can be based on MEE subscription) that the user device 104 may download the requested MEE 114 and downloads the requested MEE 114 to the user device 104. The user device 104 installs the MEE 114 and, when executing the installed MEE, is configured to access services from a corresponding mobile service provider 106. In some instances, the request engine 116 may update installed MEEs and/or remove installed MEEs in response to one or more events. While the illustrated implementation includes the single server 102, system 100 may include any number of servers 104 communicably coupled to the network 108. For example, the system 100 may include a server for generating MEEs 114 and a server for downloading MEEs 114.

The MEE server 102 comprises an electronic computing device operable to receive, transmit, process and store data associated with system 100. System 100 can be implemented using computers other than servers, as well as a server pool. Indeed, the MEE server 102 may be any computer, electronic or processing device such as, for example, a blade server, general-purpose personal computer (PC), Macintosh, workstation, Unix-based computer, or any other suitable device. In other words, system 100 may include computers other than general purpose computers as well as computers without conventional operating systems. The MEE server 102 may be adapted to execute any operating system including Linux, UNIX, Windows Server, Android, or any other suitable operating system. In certain implementations, the MEE server 102 may also include or be communicably coupled with a web server and/or a mail server.

The MEE server 102 includes memory 110 and a processor 112. Memory 110 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 110 includes the MEEs 114. Local memory 110 may also include any other appropriate data such as applications or services, firewall policies, a security or access log, print or other reporting files, HTML files or templates, data classes or object interfaces, child software applications or sub-systems, and others.

As previously mentioned, the MEE 114 is a layer that defines an execution environment for applications and a set of rules that applications follow to run on MCE devices. These set of rules may include one or more of the following: security properties of applications controlling which resources are available to applications from underlying hardware and/or operating system and/or from other applications and services running inside the MCE; access to device resources such as storage, sensors, and others; inter-applications Application Program Interfaces (APIs); access to window/graphical subsystem of the device; and others. The MEE 114 may also provide functionality to manage applications that include downloading, installing, and/or removing applications from a cloud based store/repository. The MEE 114 may also include additional services for applications such as an advertisement framework. In some implementations, the MEE 114 includes a control policy and an application framework. The control policy may include controlling purchase and download of new Apps, which Apps will be available for user, access to internet, ability to switch between different users, time and duration of execution, etc. In some instances, the application framework may be a reusable software platform used to develop applications, products and/or solutions. The application framework may include at least one of programs, compilers, code libraries, an application programming interface (API) or tool sets that combine different components to enable development of a project or solution. For example, the application framework may include one or more of the following: an activity manager, a window manager, content providers, view system, package manager, telephony manager, resource manager, location manager, notification manager, payment manager, advertisement manager, or others. In some implementations, each MEE 114 may be associated with a different mobile service provider 106 and be configured to access services from the service provider e.g. Medical Healthcare, Banking, Gaming, Social Networking provider MEEs may have application frameworks specific to their services.

Processor 112 executes instructions and manipulates data to perform operations of the MEE server 102. Although FIG. 1 illustrates a single processor 112 in the MEE server 102, multiple processors 112 may be used according to particular needs, and reference to processor 112 is meant to include multiple processors 112 where applicable. In the illustrated implementation, the processor 112 executes the request engine 116 at any appropriate time such as, for example, in response to a request or input from the content provider 106 or any appropriate computer system coupled with network 108. Request engine 116 includes any software, hardware, and/or firmware, or combination thereof, operable to download MEEs 114 to the user devices 104a-c. In the case of selecting an MEE 114, the request engine 116 may receive information from a user device 104 identifying a content provider 106, identify one or more MEEs 114 associated with the request, and transmit the MEE 114 to the user device 104 for installation. In addition to downloading the MEEs 114, the request engine 116 may receive updates to an MEE 114 from a mobile service provider 106, identify user devices 104 executing the MEE 114, and transmit the updates to the identified user devices 104. In some implementations, the request engine 116 may uninstall an MEE 114 from a user device 104 in response to at least an event. The event may include a request from the mobile service provider 106, expiration of a time period, or others.

Regardless of the particular implementation, "software," as used herein, may include software, firmware, wired or programmed hardware, or any combination thereof as appropriate. Indeed, request engine 116 may be written or described in any appropriate computer language including C, C++, C#, Java, J#, Visual Basic, assembler, Perl, any suitable version of 4GL, as well as others. It will be understood that while request engine 116 is illustrated in FIG. 1 as including individual modules, request engine 116 may include numerous other sub-modules or may instead be a single multi-tasked module that implements the various features and functionality through various objects, methods, or other processes. Further, while illustrated as internal to server 102, one or more processes associated with request engine 116 may be stored, referenced, or executed remotely. Moreover, request engine 116 may be a child or sub-module of another software module or enterprise application (not illustrated) without departing from the scope of this disclosure.

The MEE server 102 also includes interface 118 for communicating with other computer systems, such as the user devices 104*a-c* and the mobile service providers 106*a-c*, over network 108 in a client-server or other distributed environment. In certain implementations, the MEE server 102 receives data from internal or external senders through interface 118 for storage in local memory 110 and/or processing by processor 112. Generally, interface 118 comprises logic encoded in software and/or hardware in a suitable combination and operable to communicate with network 108. More specifically, interface 118 may comprise software supporting one or more communications protocols associated with communications network 108 or hardware operable to communicate physical signals.

Mobile service providers 106*a-c* comprise various entities that serve network-based services such as Banking, Shopping, eBooks publishers, Gaming, Social networking content and/or services providers, Voice and Video Telephony video content, etc. Specifically, each mobile service provider 106 may employ, operate, own, control, lease, or otherwise be associated with an electronic device (e.g., computing device) that receives, transmits, processes, or stores such content (e.g., video) for use by distributed users. For example, the mobile service provider 106 may be a television studio, movie studio, or an entity that operates on behalf of the studio such as a distributor, a data warehouse, an online video site (e.g., Netflix, YouTube), and/or any other suitable domain or web server. In addition or alternatively, the mobile service provider 106 may provide access to services associated with gaming, finance, medical, and/or other fields. In some examples, the mobile service provider 106 may be a financial institution such as a bank. In some examples, the mobile service provider 106 may be a medical institution such as a doctor's office or a hospital. In some examples, the content provider 106 could be a video game company. Regardless of the particular entity, the mobile service provider 106 may comprise a web server, a data warehouse, or any other computer device for providing services through the network 108. Another example is to provide additional services through a specialized AppStore/MarketPlace application that will allow to download only Apps that are approved by the MEE service provider. Examples of such services may include (but is not limited to) managing MEE for kids, provide secure access to payment systems included into MEE by limiting that only approved applications can be installed, secure access to medical records, etc. To do that, service provider may decide to host an Application store on network and pre-install a specialized AppStore/MarketPlace App on its MEE. Network 108 facilitates wireless or wired communication between MEE server 102 and any other local or remote computer, such as user devices 104. For example, the network 108 may be a cable network, satellite network, IPTV network, the Internet, an enterprise network, and/or other networks. In some implementations, the network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications of services and client data between the MEE server 102, the mobile service providers 106, and the user devices 104. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Each user devices 104*a-c* comprises an electronic device operable to interface the network 108. As used in this disclosure, the user device 104 is intended to encompass tablet computers (e.g., iPad), UMPCs, setup box, entertainment centers, TV, cellular phones (e.g., iPhone), data phones, pagers, portable computers, SIP phones, smart phones, personal data assistants (PDAs), digital cameras, MP3 players, camcorders, one or more processors within these or other devices, or any other suitable processing devices capable of communicating information with the network 108. In some implementations, the user devices 104 may be based on cellular radio technology. For example, the user device 104 may be a PDA operable to wirelessly connect with an external or unsecured network. In another example, the user device 104 may comprise a digital multimedia player that includes an input device, such as a keypad, a jog wheel, a jog dial, touch screen, or other device that can accept information or allows selection of user interface elements, and an output device that conveys information associated with the system 100, including digital data, visual information, or a Graphical User Interface (GUI) 120.

The GUI 120 comprises a graphical user interface operable to allow the user of the device 104 to interface with at least a portion of the system 100 for any suitable purpose, such as viewing multimedia. Generally, the GUI 120 provides the particular user with an efficient and user-friendly presentation of data provided by or communicated within the system 100. The GUI 120 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 120 can include any graphical user interface, such as a generic web browser or touch screen, which processes information in the system 100 and presents the results to the user. The MEE server 102 can accept data from the device 104 using, for example, from App running on a device or the web browser (e.g., Microsoft Internet Explorer or Mozilla Firefox) and return the appropriate responses (e.g., HTML or XML) to the App or browser using the network 108.

Figure 2:
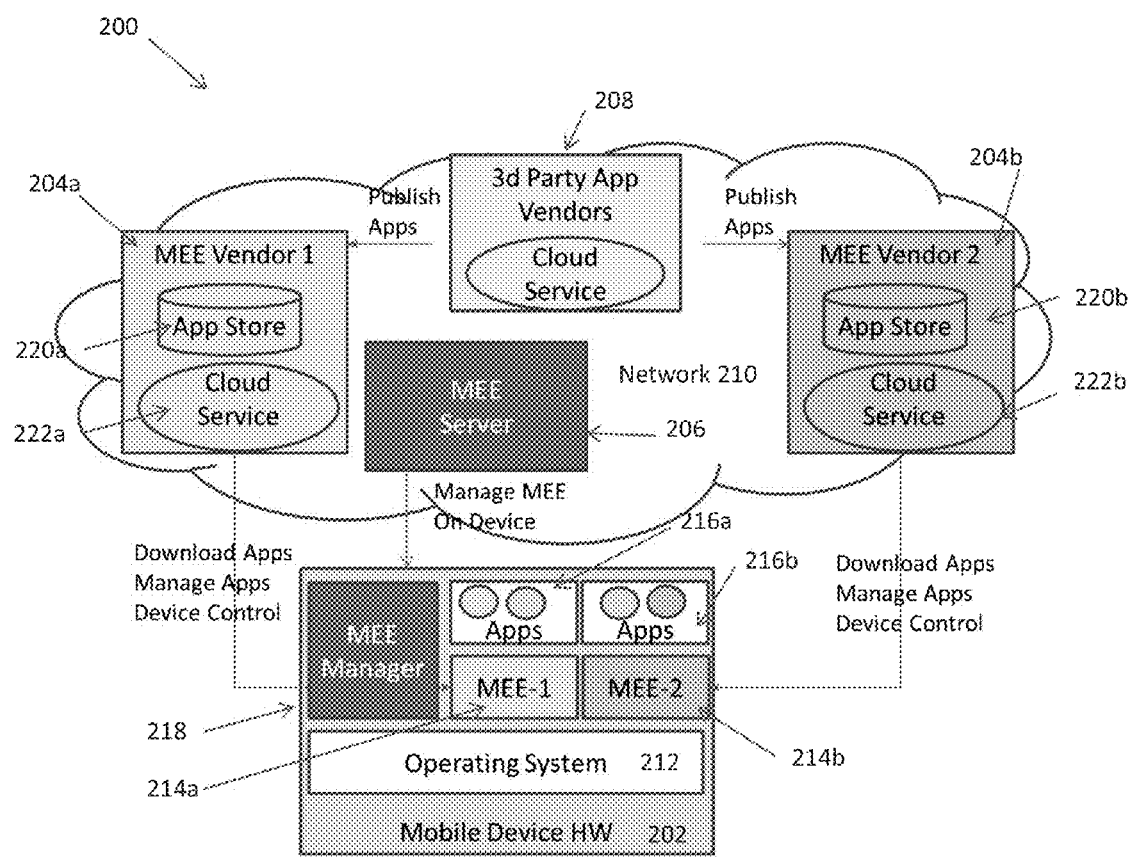
FIG. 2 illustrates an example system for providing multiple virtual mobile devices in a single mobile device.

FIG. 2 illustrates an example system 200 for providing multiple virtual mobile devices in a single mobile device 202. In particular, the system 200 includes the mobile device 202, MEE vendors 204*a* and 204*b*, MEE Server 206, and third party vendors 208 communicably coupled through the network 210. The mobile device 202 includes a single operating system 212 and two different MEEs 214*a* and 214*b* running on the same operating system 212. The applications 216*a* run in the MEE 214*a* and are configured to provide services from the MEE vendor 204a. Similarly, the applications 216b run in the MEE 214b and are configured to provide services from the MEE vendor 204b. In some implementations, the applications 216a and 216b are different applications and provide different services to users. In addition, the mobile device 202 includes the local MEE manager 218, and the local MEE manager 218 coordinates with the MEE Server 206 to dynamic download, install, and remove the MEEs 214a and 214b. For example, the local MEE manager 218 and the MEE Server 206 manage users and their associations with the MEE 214 including creating/deleting users, switching between users, installing/uninstalling MEEs 214 on the mobile device 202, and others. In some implementations, the local MEE-1 214a and the applications 216a that belong to User-1 create a pair including a system identifier (ID) and a user ID to grant access to an MEE 214 and associated applications 216. In addition, the local MEE manager 218 and the MEE Server 206 may provide a messaging delivery mechanism and/or information sharing between users on the same device 202 and between network and users.

The third-party application vendors 208 publish applications through the MEE vendors 204 to sell to mobile devices such as mobile device 202. In some implementations, the third-party application vendors 208 internally develop the published applications and may provide cloud services in connection with the applications. Each MEE vendor 204 may include an application store 220 configured to sell applications directly to the mobile device 202 and cloud service 222. Alternatively MEE vendor may share application store with other MEE vendors.

In one aspect of operation, the mobile device 202 transmits requests to the MEE Server 206 for the MEEs 214a and 214b. If not already installed, the MEE Server 206 may initially install the local MEE manager 218 on the mobile device 202. After installation, the MEE Server 206 downloads the MEE 214a and 214b to the mobile device 202. The local MEE manager 218 may assist in installing the MEE 214a and 214b. As previously mentioned both the MEE 214a and 214b run on the same operating system 212 and are configured to access services from the MEE vendors 204a and 204b, respectively. The third-party application vendors 208 publish applications on the MEE vendors 204a and 204b for purchase by the mobile device 202. A user accessing the MEE 214a may purchase applications from the application store 220a and access cloud services from the cloud service 222a, and a user accessing the MEE 214b may purchase applications from the application store 220b and access cloud services from the cloud service 222b. The applications 216 may represent applications purchased from the MEE vendors 204.

Figure 3:
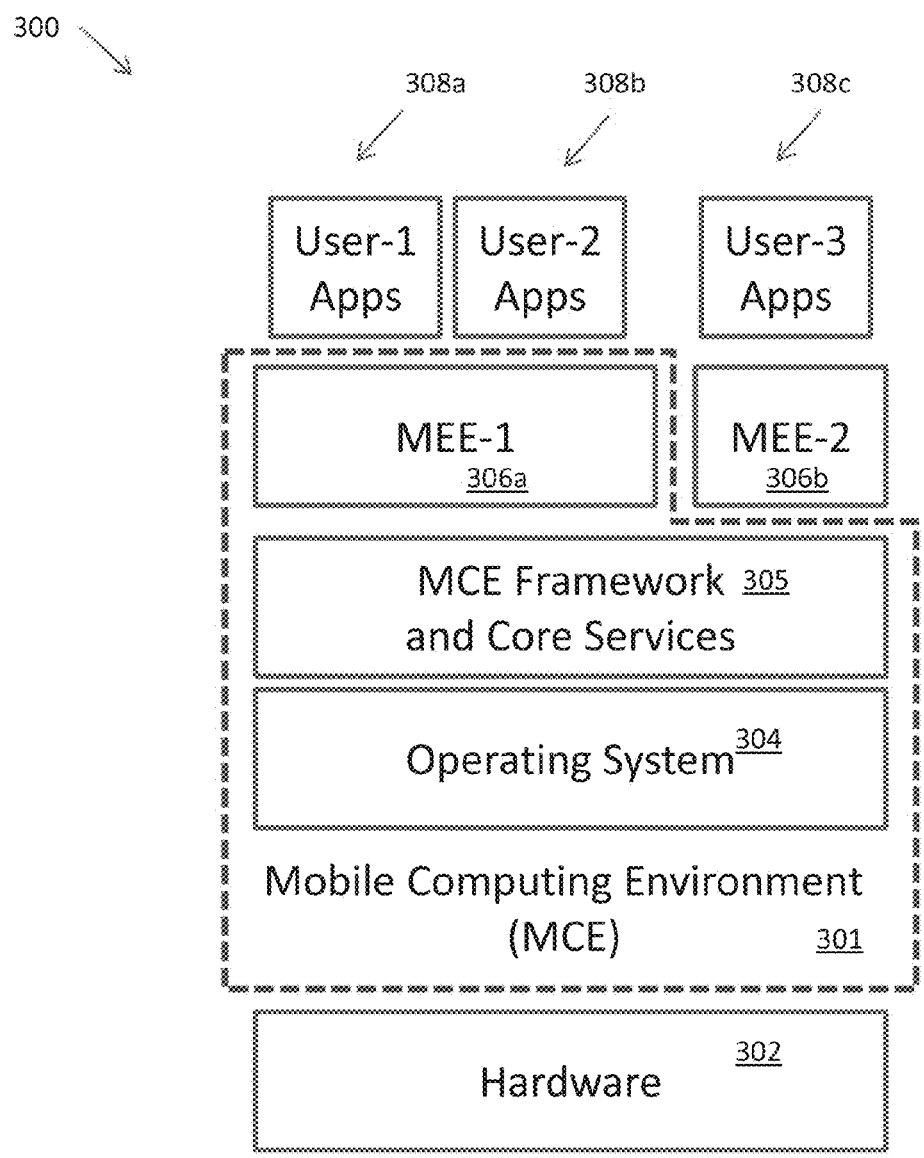
FIG. 3 is a block diagram illustrating the example mobile-system architecture.

FIG. 3 is a block diagram illustrating the example mobile-system architecture 300. In particular, the architecture 300 includes a hardware layer 302 and Mobile Computing Environment (MCE) 301. MCE 301 can be further divided into an operating system layer 304, MCE Framework & Core Services 305, MEE 306a and 306b, and user applications 308a-c. The hardware layer 302 is a physical hardware with firmware for a mobile device. The operating system layer 304 is comprised of a set of programs that manage computer hardware resources and provide common services for software. As previously discussed, the MCE Framework 305 and MEE 306 is a layer that defines an execution environment for applications and a set of rules (framework) that applications follow to be able to run on MCE devices 301. The application layer 308 is a set of applications that extend the functionality of the device. For example, the applications 308 can be a stand-alone application or tools that do not depend on a cloud (e.g., calculator, camera) or applications or tools that deliver cloud-based services in a native form, i.e, not via a browser.

A mobile system including this architecture 300 may be capable of providing different system functions and/or services for each user. The different functions and/or services can be presented as two associations: (1) mobile device having multiple systems with each of the systems being identified with its own system ID; and (2) user being identified with a system ID, a user ID, user resources, and user properties. In the illustrated example, the mobile device has two systems installed, i.e., MEE 306a and 306b, and three users are created: Use-1, User-2, and User-3. User-1 and User-2 use MEE 306a, and User-3 uses MEE 308c. Each user has its own applications 308 installed that may not be visible to other users.

Figure 4:
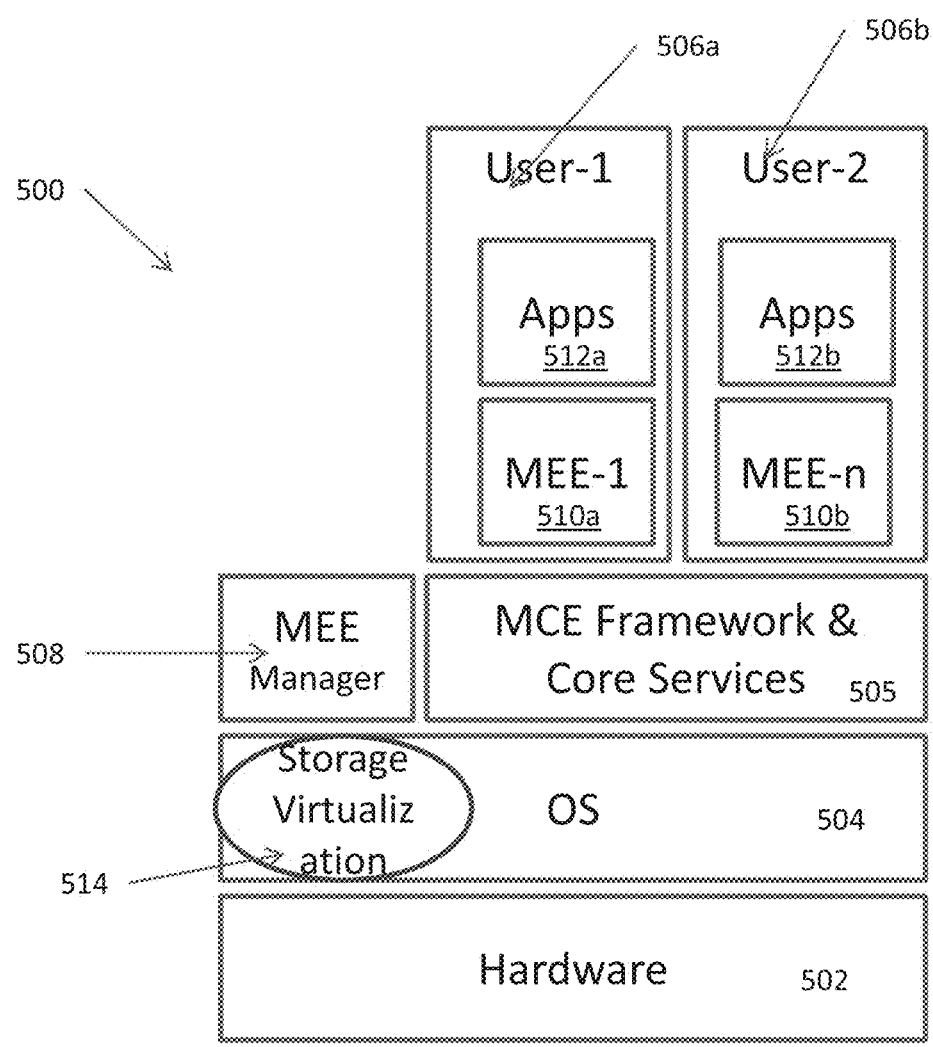
FIG. 4 is a block diagram of architecture for implementing a system with multiple users and multiple systems.

FIG. 4 is a block diagram of architecture 500 for implementing a system with multiple users and multiple systems. In particular, the architecture 500 includes hardware 502, an operating system 504, MCE Framework & Core Services 505, users 506a and 506b, a MEE Manager 508, and storage virtualization 514. The user 506a includes the MEE 510a and the applications 512a, and the user 506b includes the MEE 510b and the applications 512b. In some implementations, the user 506a, the MEE 510a, and the applications 512a are different from the user 506b, the MEE 510b, and the applications 512b, so the architecture 500 is for a multisystem/multiuser system. The MEE Manager 508 interacts with OS 504 to use its underlying virtualization support for storage virtualization 514. For an MEE based on Linux OS, virtualization may be managed using a number of methods. Although each method is different, the described methods support mapping (or binding, or fusing) directories and files stored in different places (directories) in the file system. When based on the file system in user space (FUSE), the file system is implemented in a user space program, which interacts with the FUSE kernel module. When based on the mount options bind, rbind, or move, the file system is implemented using a built-in features of contemporary OSS that allows the same content to be available (mounted) under more than one directories. When based on Linux soft and/or hard links, access to the directory may be provided through an alternative path. When based on a loop device mount, the file system is created as a file and stored within file system. That file can be later mounted/un-mounted to a specified directory. When based on an encrypted loop device, the file system is created as an encrypted file and stored within file system.

FIGS. 5, 7-12, 15, 16, and 18 are flow charts for managing MEEs. These methods are for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Figure 5:
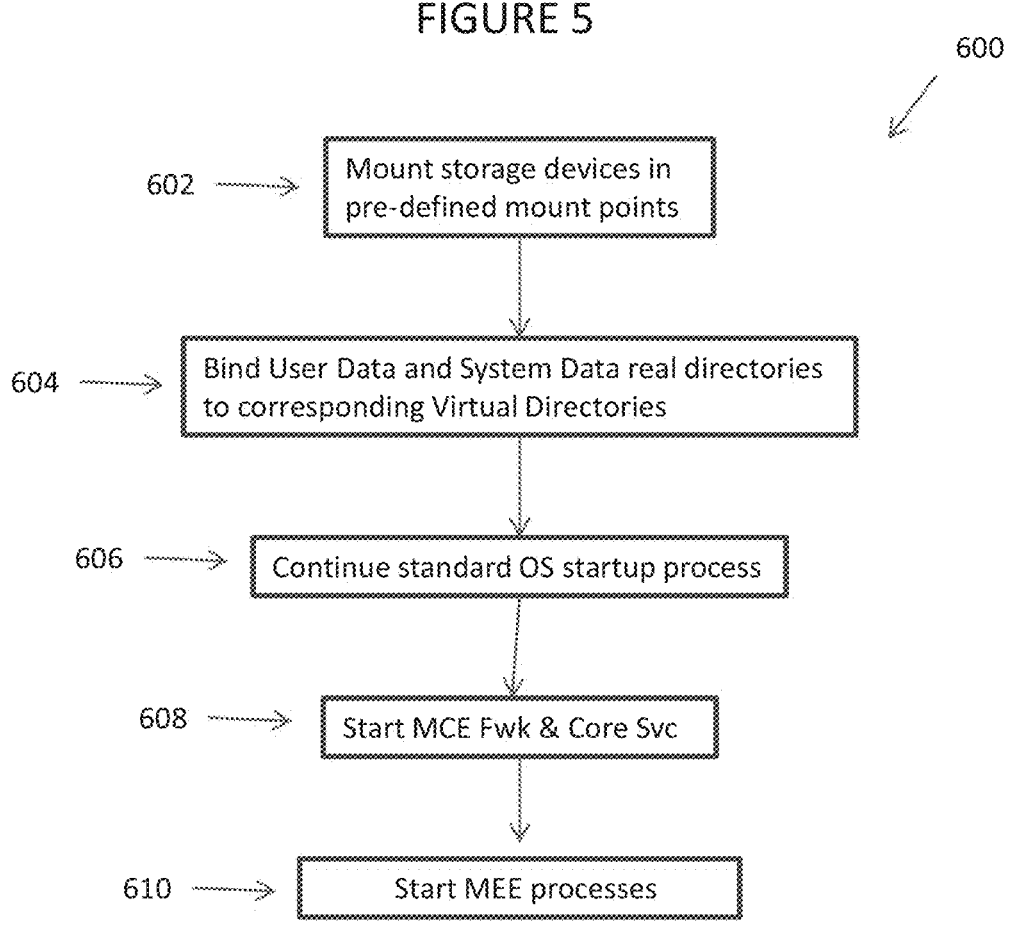
FIG. 5 is a flow chart illustrating an example method for a system startup with an early MEE Manager start.
Figure 6:
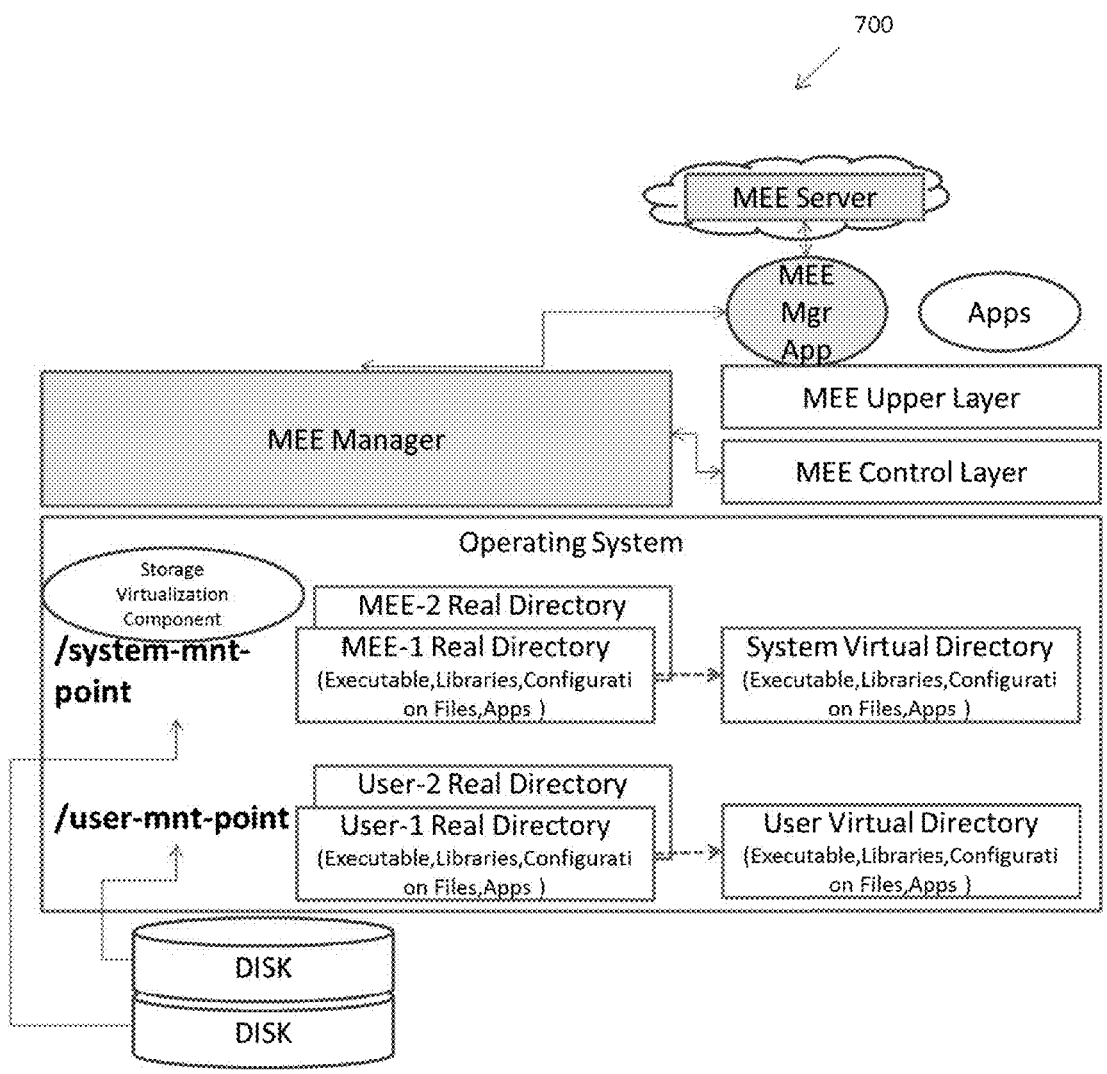
FIG. 6 is a block diagram illustrating the binding described with respect to FIG. 5.

FIG. 5 is a flow chart illustrating an example method 600 for a system startup with a early MEE Manager start. Method 600 begins at step 602 where, during OS boot process, OS (or first user space process) mounts storage devices in the predefined mount points. System data and user data may be stored on different storage devices or partitioning and may be mounted with different options such as read-only, read-write, or other permissions. When the OS is Linux, this step may executed by the first user space process called 'init'. At step 604, the Init process in Linux, or another process in other OS responsible for mounts, 'binds' user data and system data real directories to corresponding virtual directories. Next, at step 606, the standard OS startup process continues. Init process starts MCE Framework and Core Services at step 608. The MEE Manager may be started as a part of MEE control processes (MEE Manager late start), in this case binding user data and system data will happen later in a boot process and may require coordination between MEE Manager and other OS processes. At step 610, the MCE framework & Core services process starts the MEE level processes. At this point, the MEE is the particular MEE system that was bound at step 604 and applications started for a particular user that was bound at step 2. In other words, after step 604, USER-1 is active and its applications are running inside MEE-1. FIG. 6 is a block diagram 700 illustrating the binding described with respect to FIG. 5.

Figure 7:
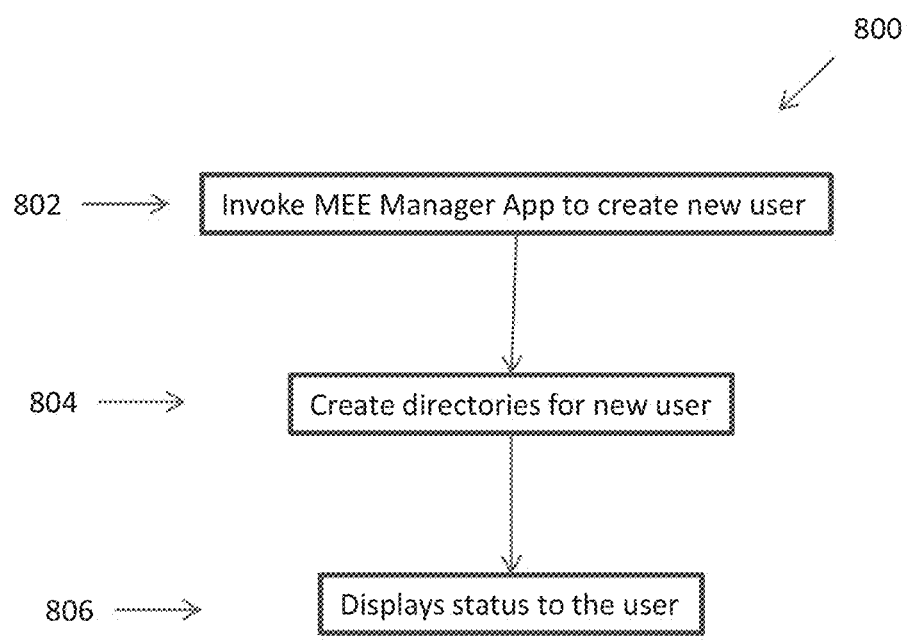
FIG. 7 is a flow chart illustrating an example method for adding a new user.

FIG. 7 is a flow chart illustrating an example method 800 for adding a new user. Method 800 begins at step 802 where a user invokes an MEE Manager application to create a new user. The MEE Manager application may allow a user to enter properties of the new user including information about which system the new user will use and additional properties to identify new user (e.g., name, email address, picture). The new user may or may not be previously registered with MEE Server cloud for additional services such as data and apps backup, notification services, or other services. At step 804, the MEE Manager application requests the MEE Manager subsystem to create directories for new user. The MEE Manager application and MEE Manager subsystem interactions may be based on inter-process communications (IPC) methods defined by the MEE. For Android MEEs, this IPC is based on the Android Binder mechanism. The MEE Manager subsystem may create directories for the new user and respond with a status of the operation to MEE manager application. Next, at step 806, the MEE Manager application displays the status to the user. At this point, the real directories have been created or marked to be created for the new user. If directories are not created at this point, it may be created when user is switched to its environment first time. Depend on the underlying MEE platform, the directories for the new user may or may not be empty. For an Android based MEE, the user directories can be empty.

Figure 8:
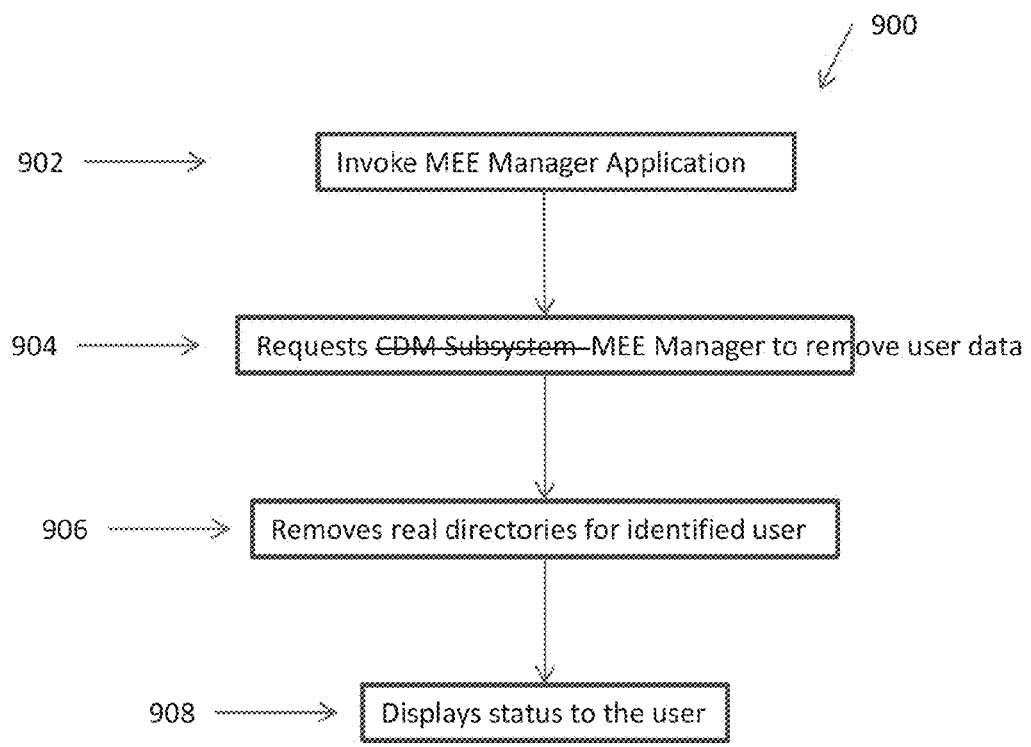
FIG. 8 is a block diagram illustrating an example method for deleting existing users.

FIG. 8 is a block diagram illustrating an example method 900 for deleting existing users. Method 1000 begins at step 902 where the user invokes the MEE Manager application. The MEE Manager application may present a list of currently installed users. The current user may select another user to be removed. In some instances, the current user cannot be removed. At step 904, the MEE Manager application requests MEE Manager subsystem to remove user data. Next, at step 906, the MEE Manager subsystem removes real directories for the selected user or marked it for later deletion and responds back with an operation status. Since the selected user is not active, the user directories are not bound to virtual directories and can be removed. At step 908, the MEE Manager application displays the status to the current user.

Figure 9:
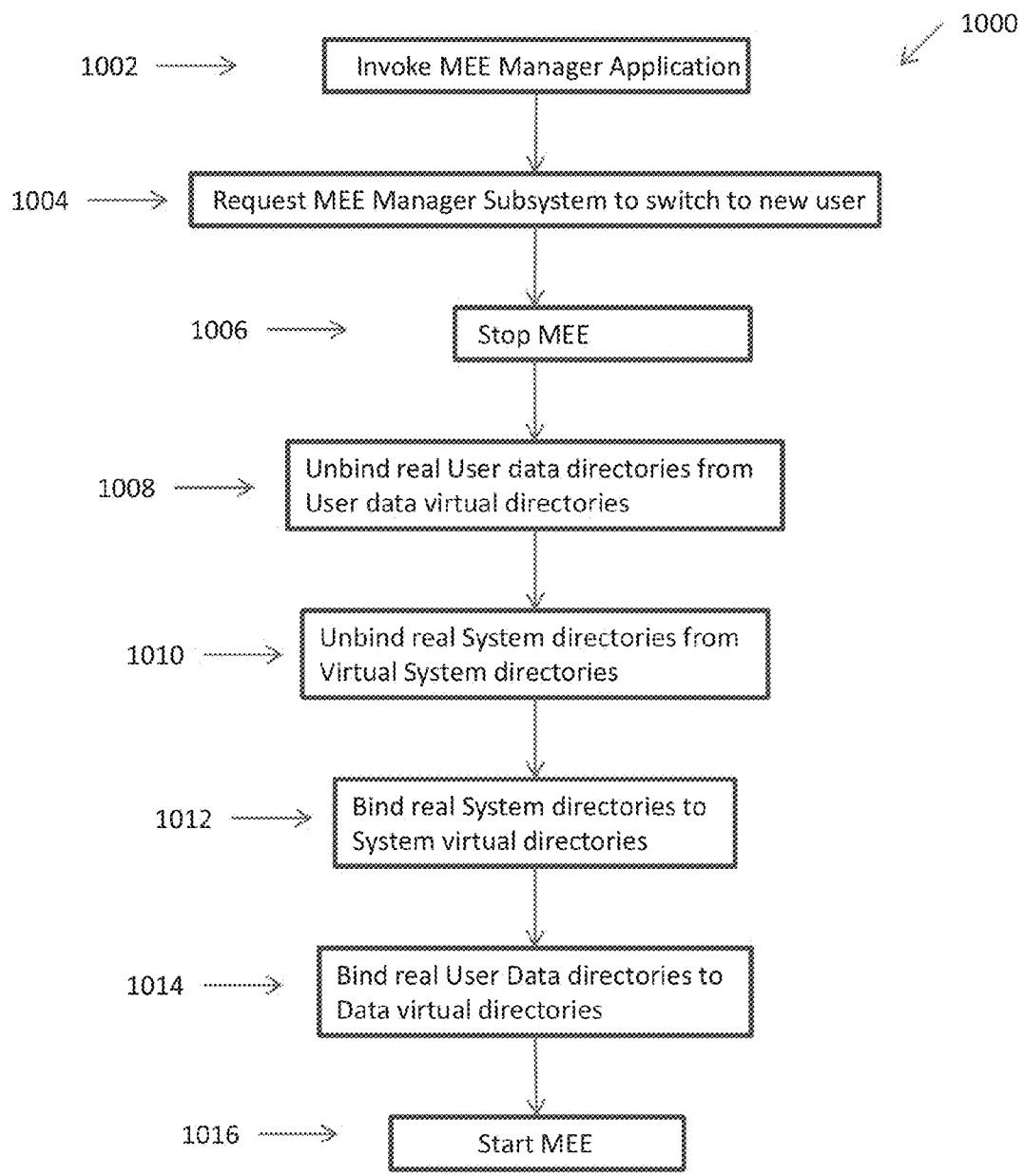
FIG. 9 is a flow chart illustrating an example method for switching between users.

FIG. 9 is a flow chart illustrating an example method 1000 for switching between users. Method 1000 begins at step 1002 where a user invokes the MEE Manager application. The MEE Manager application may display a list of currently installed users. The current user may select a user to switch to. At step 1004, the MEE Manager application requests the MEE Manager subsystem to switch to new user. This request may contain a user-id and a system-id for a destination user. Next, at step 1006, the MEE Manager subsystem interacts with the MCE Framework & Core Services to stop the MEE, which stops currently active applications and MEE services for a current user. The MEE Manager subsystem unbinds the real user data directories from the user data virtual directories at step 1008. At step 1010, the MEE Manager subsystem unbinds the real system directories from virtual system directories, which assumes that the previous system-id and new system-id are different. If the previous system-id and new system-id are the same, step 1010 can be omitted. The MEE Manager system may compare previous and next system-id to determine whether to omit step 1010. Next, at step 1012, the MEE Manager system binds the real system directories to the system virtual directories. If step 1010 is omitted, then step 1012 can also omitted. The MEE Manager system binds the real user data directories to the data virtual directories at step 1014. At step 1016, the MEE Manager system requests that the MCE Framework & Core Services to start the MEE layer.

Figure 10:
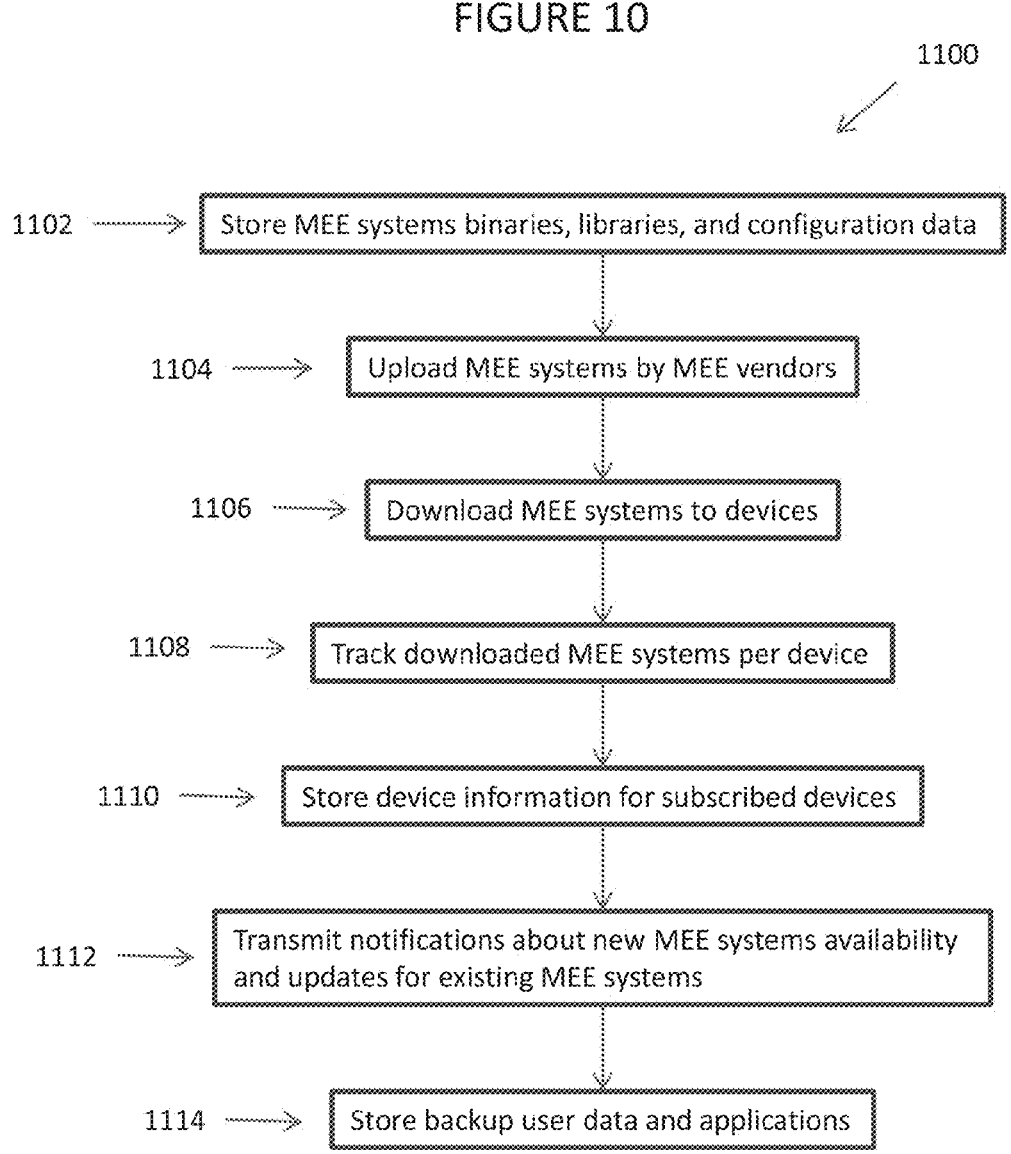
FIG. 10 is a flow chart illustrating an example method for installing a new MEE.

FIG. 10 is a flow chart illustrating an example method 1100 for installing a new MEE. Method 1100 begins at step 1102 where the MEE Server cloud stores the MEE's binaries, libraries, and configuration data. The MEE may be different for different device manufacturers or device types. A step 1104, the MEE Server cloud provides a mechanism to upload the MEE associated with the MEE vendors. Next, at step 1106, the MEE Server cloud provides a mechanism to download MEEs to devices such as an interface between the MEE Manager application and the MEE Server cloud. The MEE Server cloud tracks downloaded MEEs per device at step 1108. At step 1110, the MEE Server cloud stores information on devices subscribing to the services. Next, at step 1112, the MEE Server cloud provides a notification mechanism (e.g., interface between the MEE Manager application and MEE Server cloud) about new MEE systems availability and updates for existing MEE systems. At step 1114, the MEE Server provides a backup repository for user data and applications, which may allow users to synchronize the virtual device information across physical devices. The protocols used to communicate between the MEE Server cloud and the MEE Manager applications may include HTTP/HTTPS, FTP/FTPS, SSH, and/or others.

Figure 11:
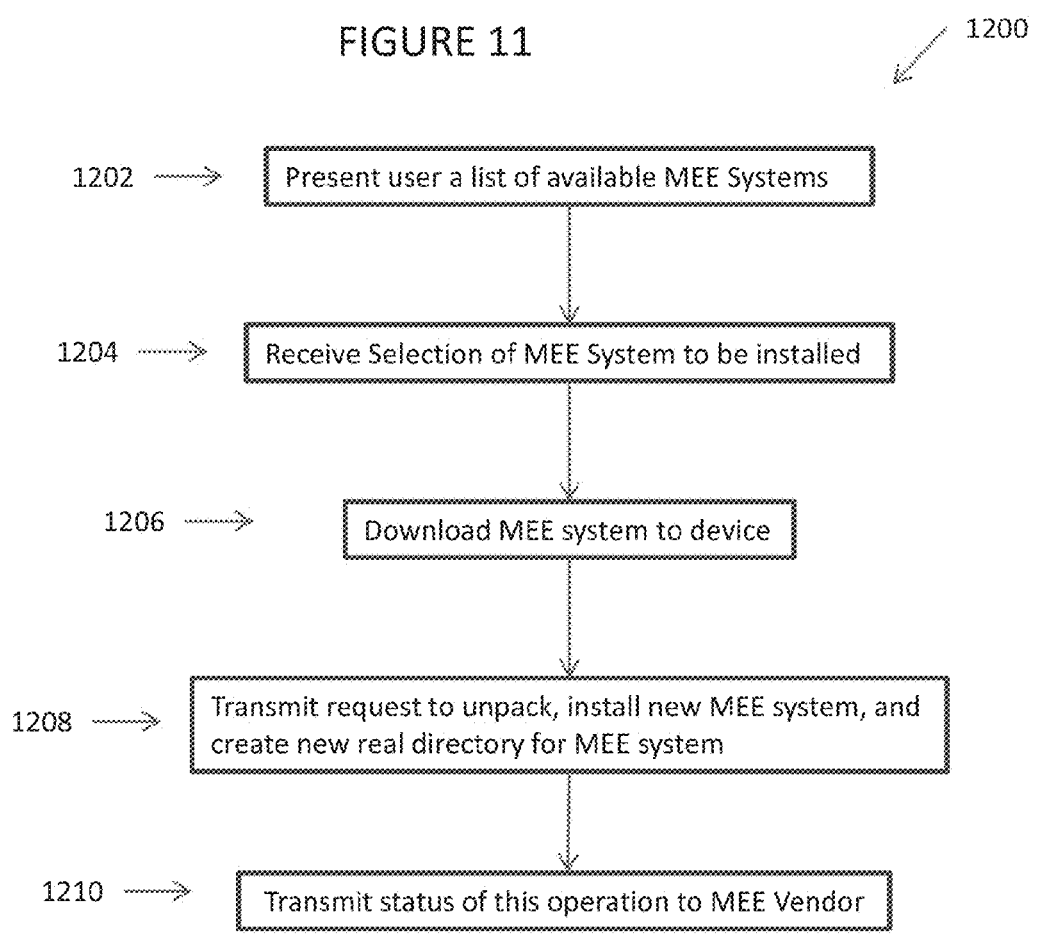
FIG. 11 is a flow chart illustrating an example method for installing a new MEE.

FIG. 11 is a flow chart illustrating an example method 1200 for installing a new MEE. The new MEE may be installed using the MEE Manager application or an application from an MCE vendor. In the case of the MEE Manager application, a user invokes the MEE Manager application prior to the selection. Method 1200 begins at step 1202 where a user is presented a list of available MEE systems. At step 1204, the user selects an MEE to be installed and optionally pays for the service. Next, at step 1206, the MEE Manager application downloads the MEE to the device storage. The MEE Manager application may request MEE Manager to unpack and install the new MEE including creating a new real directory to store the MEE. At step 1210, the MEE Manager responds with a status of this operation to the MEE Manager application. At this point, the MEE is available on device and new users can be created based on this MEE.

In the case of the application, the MCE vendor creates an application that can be published in different application stores/application markets to promote its product. The MEE may or may not be stored in the MEE Server Cloud. The user downloads the MCE vendor application that is configured to install an MEE. If MEE is not stored in the MEE Server Cloud, the MCE Vendor application downloads the new MEE to its own repository. The MCE vendor application sends a request to the MEE Manager application to install the new MEE. The request may contain or otherwise identify information about the MEE and will indicate whether to download the MEE from the MEE Server Cloud or if the MEE has already been downloaded by the MCE Vendor application. The MEE Manager application sends a request to the MEE Manager subsystem to unpack and install the new MEE. The MEE Manager subsystem creates a new real directory to store the MEE and responds with a status of this operation to the MEE Manager application. At this point, the MEE is available on device and new users can be created based on this MEE. The MEE Manager application responds with a status of this operation to the MCE Vendor application.

Figure 12:
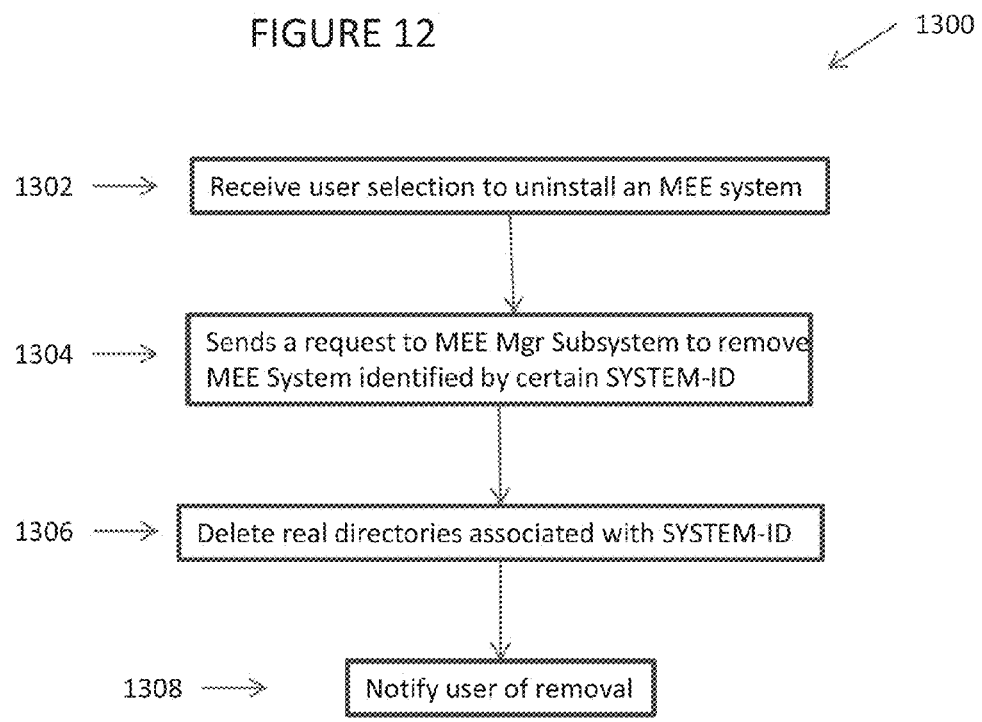
FIG. 12 is a flow chart illustrating an example method for removing a previously installed MEE.

FIG. 12 is a flow chart illustrating an example method 1300 for removing a previously installed MEE. Method 1300 begins at step 1302 where user invokes the MEE Manager application and selects the MEE to be un-install. The MEE may be uninstalled if it is not used (associated) with any user defined on device. In such case, the MEE Manager application will ask the user to remove all users that are associated with the MEE to be removed. At step 1304, the MEE Manager application sends a request to the MEE Manager subsystem to remove the MEE identified by certain system ID. Next, at step 1306, the MEE Manager subsystem removes the real directories associated with the system ID and notifies the MEE Manager application of the status. At step 1308, the MEE Manager application informs the user of the result of the operation.

Figure 13:
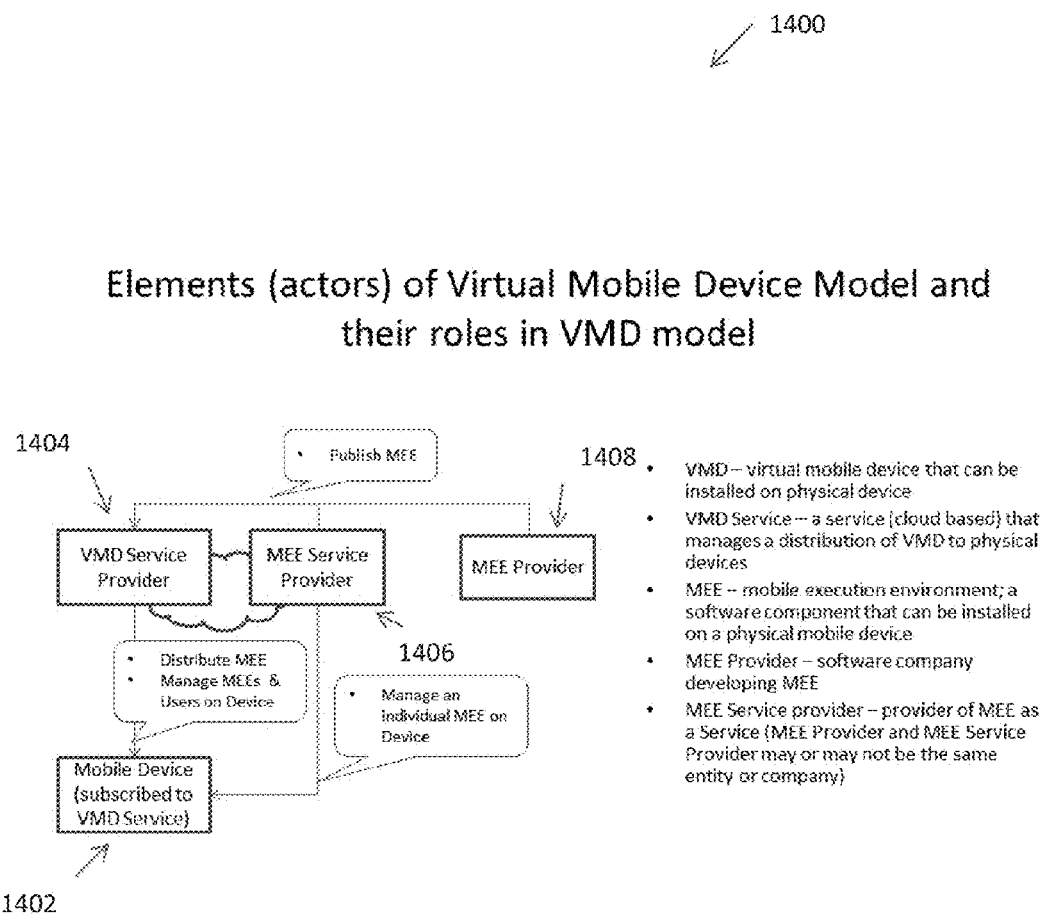
FIG. 13 is a system for delivering virtual mobile (devices) to physical devices.

FIG. 13 is a system 1400 for delivering virtual mobile (devices) to physical devices. In particular, the system 1400 includes a mobile device 1402 including an installed virtual mobile device (VMD) and is subscribed to a VMD service. A VMD service may include a service (cloud based) that manages a distribution of VMDs to physical devices. The VMD service provider 1404 distributes MEEs and manages MEEs and users on the mobile devices including the mobile device 1402. The MEE service provider 1406 may be a provider of MEE as a service. The MEE provider 1408 is the software company developing the MEE. The MEE service provider 1406 and the MEE provider 1408 may or may not be the same entity. In one aspect of the operation, the MEE service provider 1406 publishes the MEEs on the network of the VMD service provider 1404. The user of the mobile device 1402 subscribes to VMD service. The user of mobile device 1402 discovers available MEEs either from VMD service provider 1404 or by downloading an MEE using application by a vendor. The user of mobile device 1402 may define a new user profile for the installed MEE. At this point, the user may switch between user profiles.

Figure 14:
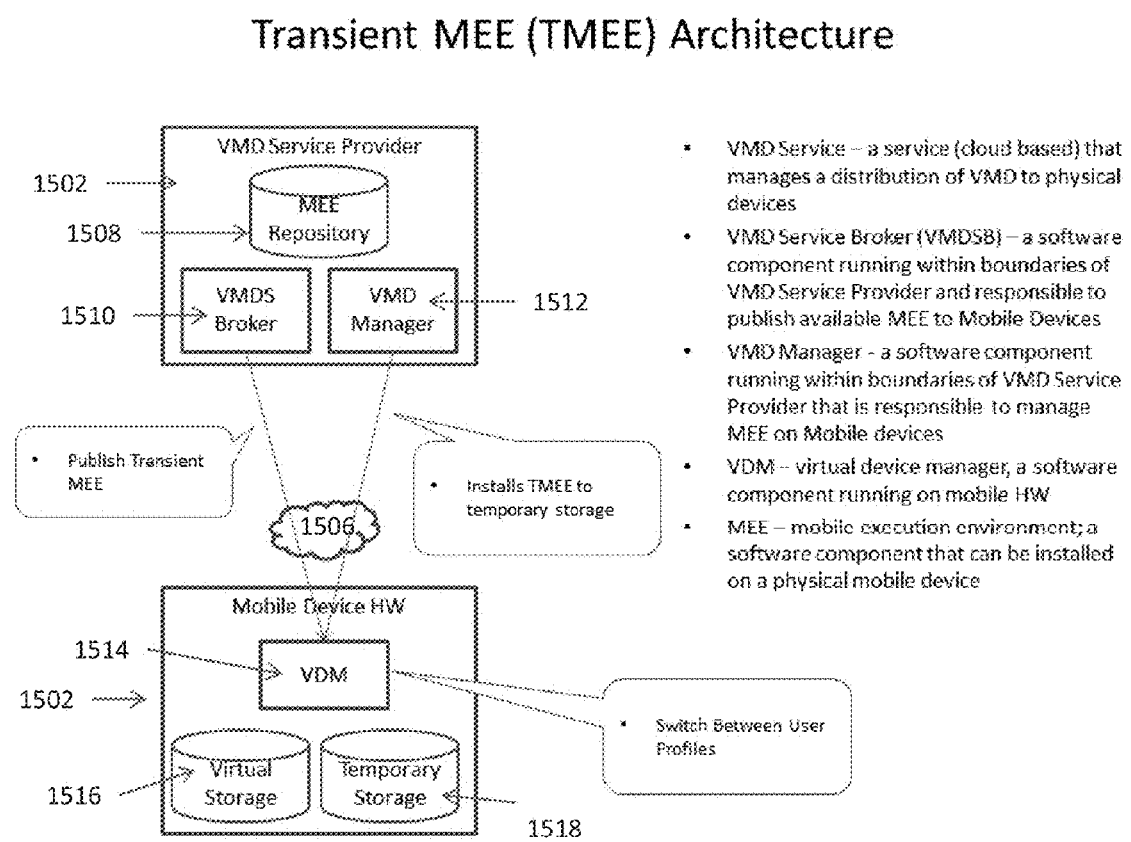
FIG. 14 is a system for providing a transient MEE to physical devices.

FIG. 14 is a system 1500 for providing a transient MEE to physical devices. A transient MEE is an MEE with pre-packaged applications that may be available (installed) on a user device for a limited time. The transient MEE may or may not allow adding more applications on top of transient MEE. A period when MEE is available on the user devices can be defined by: time duration (e.g., promotion period); a geo location of a device belong to certain area (e.g., device is located in an arena where leaving the arena will uninstall that MEE); connectivity to certain access network; or others. For example, the transient MEE may be installed when a user device is connected to a broadband operator network (e.g., AT&T, Verizon, Municipal network), a business-provided network (e.g., Starbucks, McDonalds, Wal-Mart, Malls, Enterprise), or others. Also, a transient MEE may be used in business-to-consumer, business-to-business, and/or consumer-to-consumer cases. For example, a transient MEE may be created for an event such as promotion/shopping events, sport events, music festivals, or others. A transient MEE may be created by entertainment service providers such as video service providers, gaming service providers, or others. The transient MEE may enable a user to rent pre-packaged applications. Also, the transient MEE may be created for social interactions between users.

As illustrated, the system 1500 includes a VMD service provider 1502 communicably coupled to the mobile device 1504 through the network 1506. The VMD service provider 1502 includes an MEE repository 1508, a VMDS broker 1510, and a VMD manager 1512. The VMDS broker 1510 may include a software component running within boundaries of the VMD service provider 1502 and responsible for publishing available MEEs to the mobile device 1504. The VMD manager 1512 may include a software component running within boundaries of the VMD service provider 1502 that is responsible for managing MEEs on the mobile device 1504. The mobile device 1504 includes the VDM 1514, the virtual storage 1516, and the temporary storage 1518. The VDM 1514 can include a software component running on the mobile device 1504.

Figure 15:
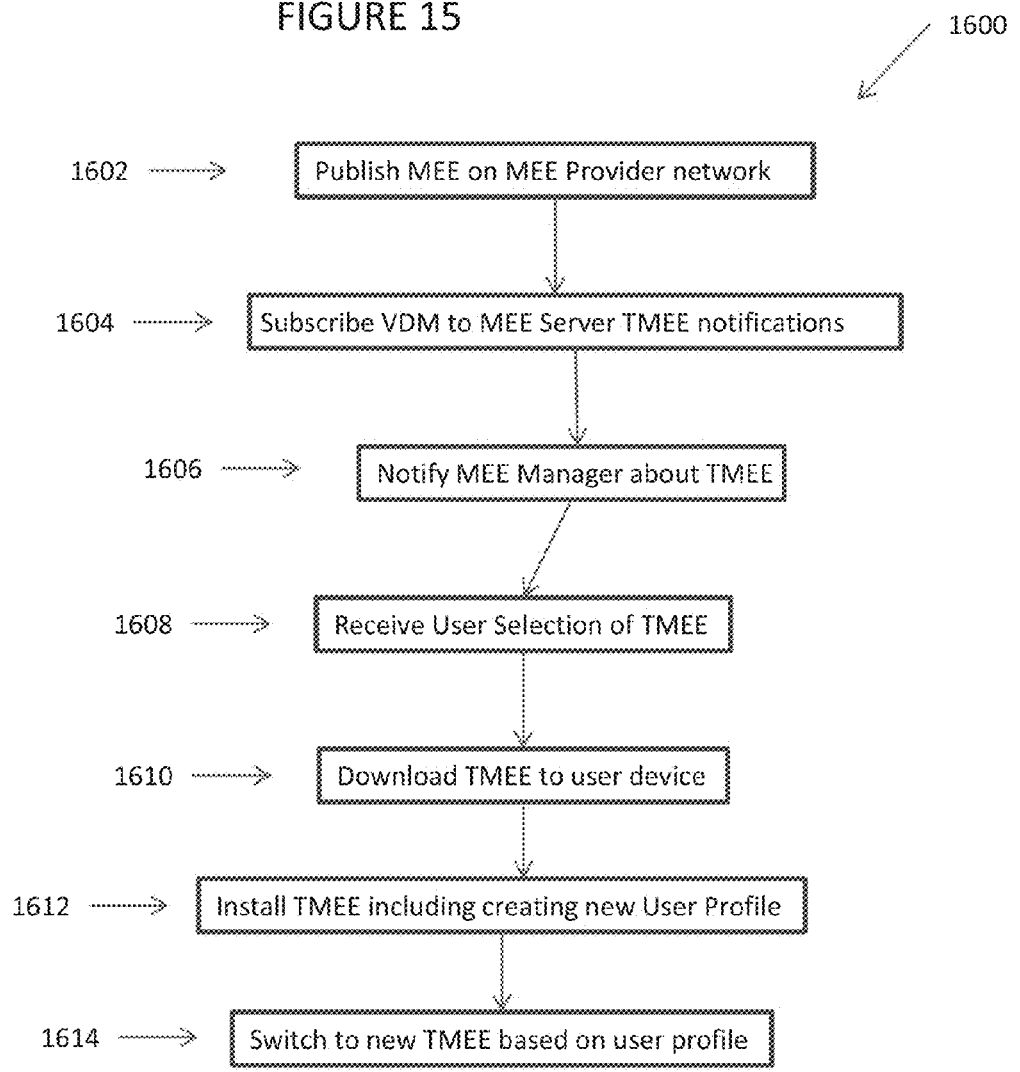
FIG. 15 is a flow chart illustrating a method for downloading a Transient MEE (TMEE)

FIG. 15 is a flow chart illustrating a method 1600 for downloading a Transient MEE (TMEE). Method 1600 begins at step 1602 where TMEE Service Provider publishes an MEE on a VMDS Provider network. At step 1604, a user subscribes (enables) to VMDS TMEE notifications and the VDM subscribes to the VMDS broker TMEE availability notifications. Next, at step 1606, the VMDS broker notifies the VDM about the TMEE. The notifications may be based on either on a time in which TMEE is available or based on the geo-location of mobile device. The VDM notifies User about availability of TMEE. At step 1608, the user selection of a TMEE is received. Next, at step 1610, the VDM starts downloading the TMEE. Next, at step 1612, the TMEE is installed into device temporary storage by creating a new user profile associated with the downloaded TMEE. After download and installation is completed, the VDM notifies user that the TMEE is available on the device. At step 1614, the user switches to the new TMEE based on the user profile and starts using TMEE services. A method of switching to the TMEE may be the same as switching between regular MEEs, as previously discussed.

Figure 16:
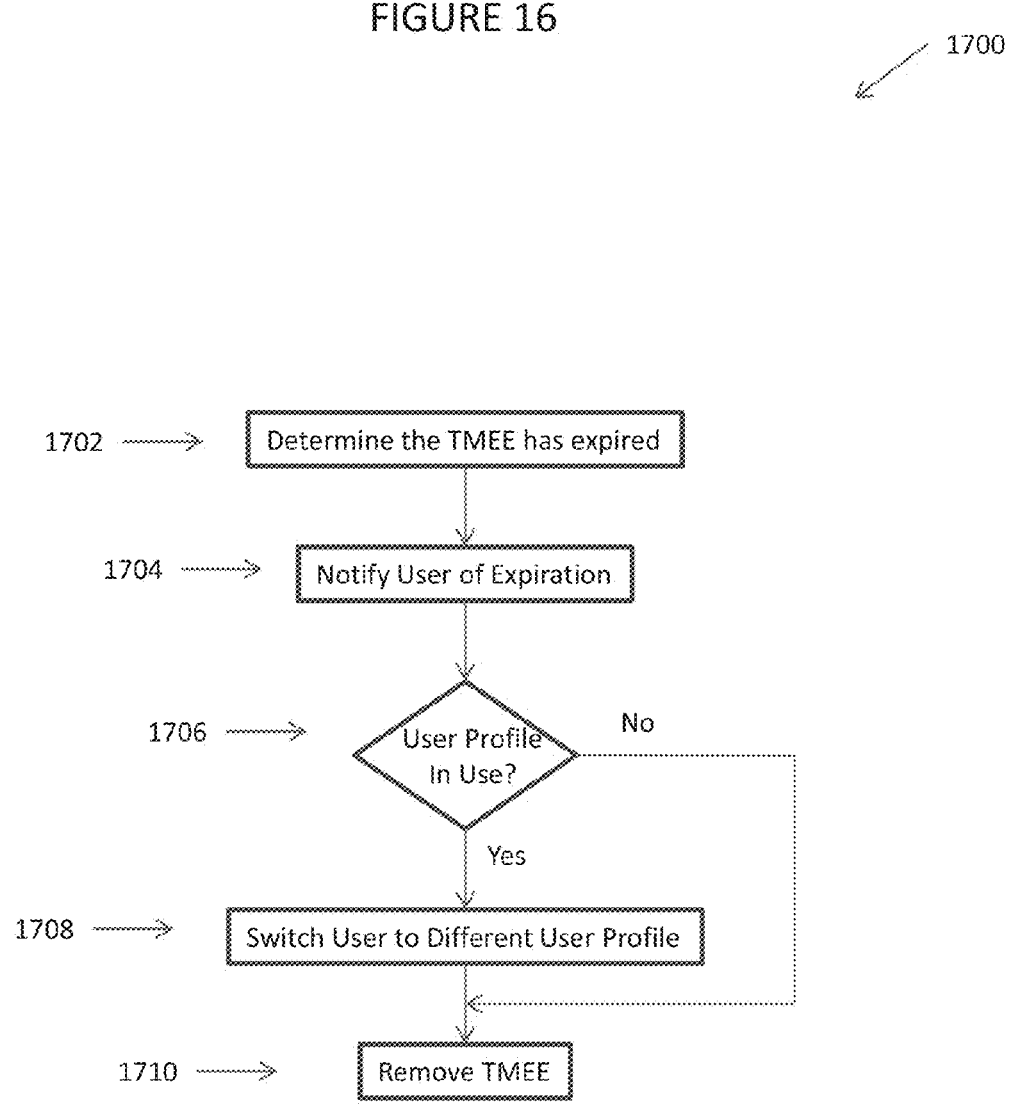
FIG. 16 is a flow chart illustrating an example method for removing a TMEE from a mobile device.

FIG. 16 is a flow chart illustrating an example method 1700 for removing a TMEE from a mobile device. Method 1700 begins at step 1702 where the TMEE has expired based on one or more of the following conditions: time period; geo-location of device; access to particular network; or other. At step 1704, the VDM notifies the user that the TMEE has expired and will be uninstalled. If the user is currently using a user profile associated with expired TMEE at decisional step 1706, then, at step 1708, the user will be switched to a different user profile. After this point, the TMEE is marked as expired and the VDM will not allow the user to select a user profile associated with the expired TMEE. At step 1710, the VDM starts removing the TMEE from temporary storage using the same procedure as removing a normal MEE. The TMEE may be associated with a profile that tells the VDM if not expired that the TMEE is available if mobile device reboots, i.e., a survive reboot. If TMEE is marked as surviving mobile reboot, the VDM will install it in non-volatile storage.

Figure 17:
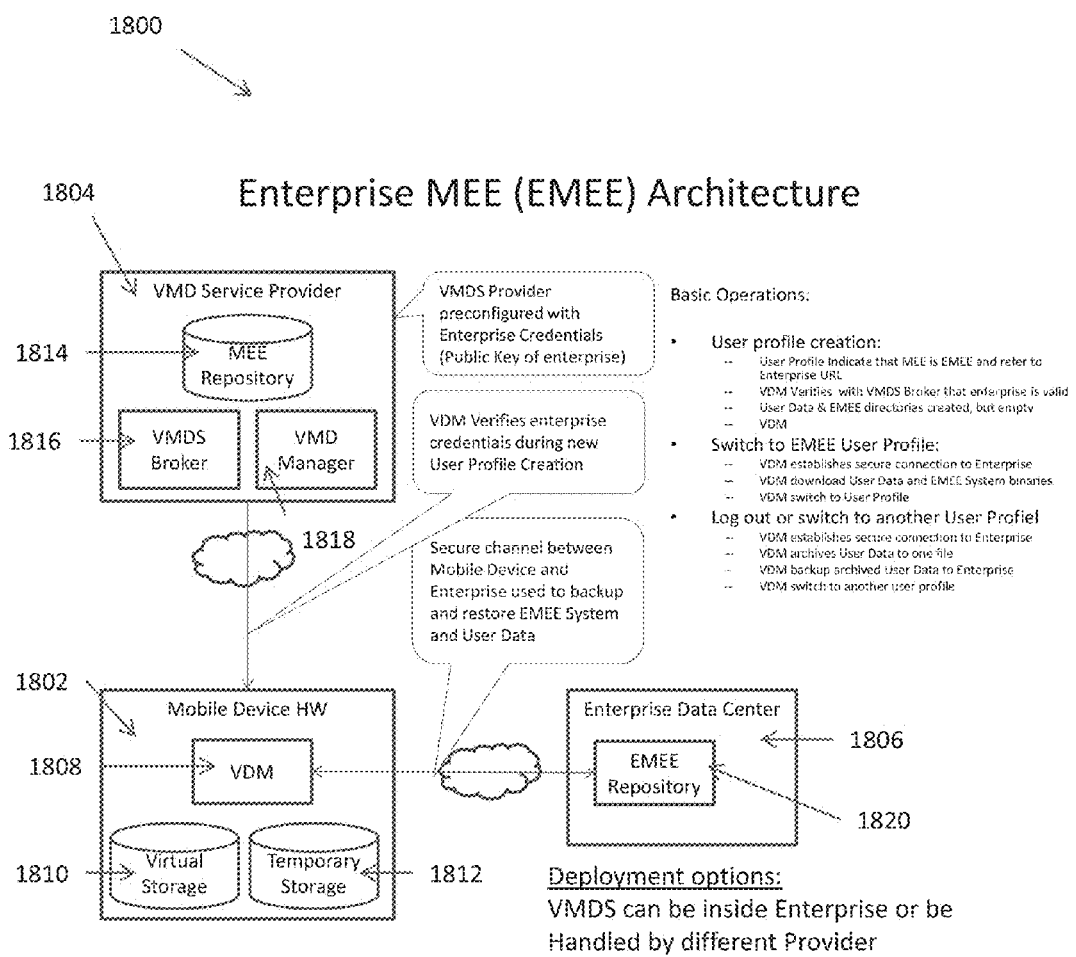
FIG. 17 is a system for managing an Enterprise MEE (EMEE)

FIG. 17 is a system 1800 for managing an Enterprise MEE (EMEE). In general, an EMEE may provide a secure, managed execution environment to employees and/or customers. For example, the EMEE may be similar to a TMEE where the MEE system and user data are stored in temporary storage on a device, but EMEE may be backed up to the enterprise network data centers before being removed from the device.

In particular, the system includes the mobile device 1802 communicably couple to the VMD service provider 1804 and the enterprise data center 1806. The mobile device 1802 includes the VDM 1808, the virtual storage 1810, and the temporary storage 1812. The VMD service provider 1804 includes the MEE repository 1814, the VMDS broker 1816, and the VMD manager 1818. The enterprise data center 1806 includes the EMEE repository 1820. During user profile creation, the system 1800 may execute one or more of the following: indicate in a user profile that the MEE is an EMEE and refer to an enterprise URL; the VDM 1808 verifies with the VMDS broker 1816 that the enterprise is valid; create user data and EMEE directories that are empty. When switching to the EMEE user profile, the VDM 1808 may execute one or more of the following: establish a secure connection to the enterprise; download user data and EMEE binaries; switch to the user profile; and/or others. When logging out or switching to another user profile, the VDM 1808 may execute one or more of the following: establish a secure connection to the enterprise; archive user data; backup archived user data to EMEE repository 1820; switch to another user profile; and/or others.

Figure 18:
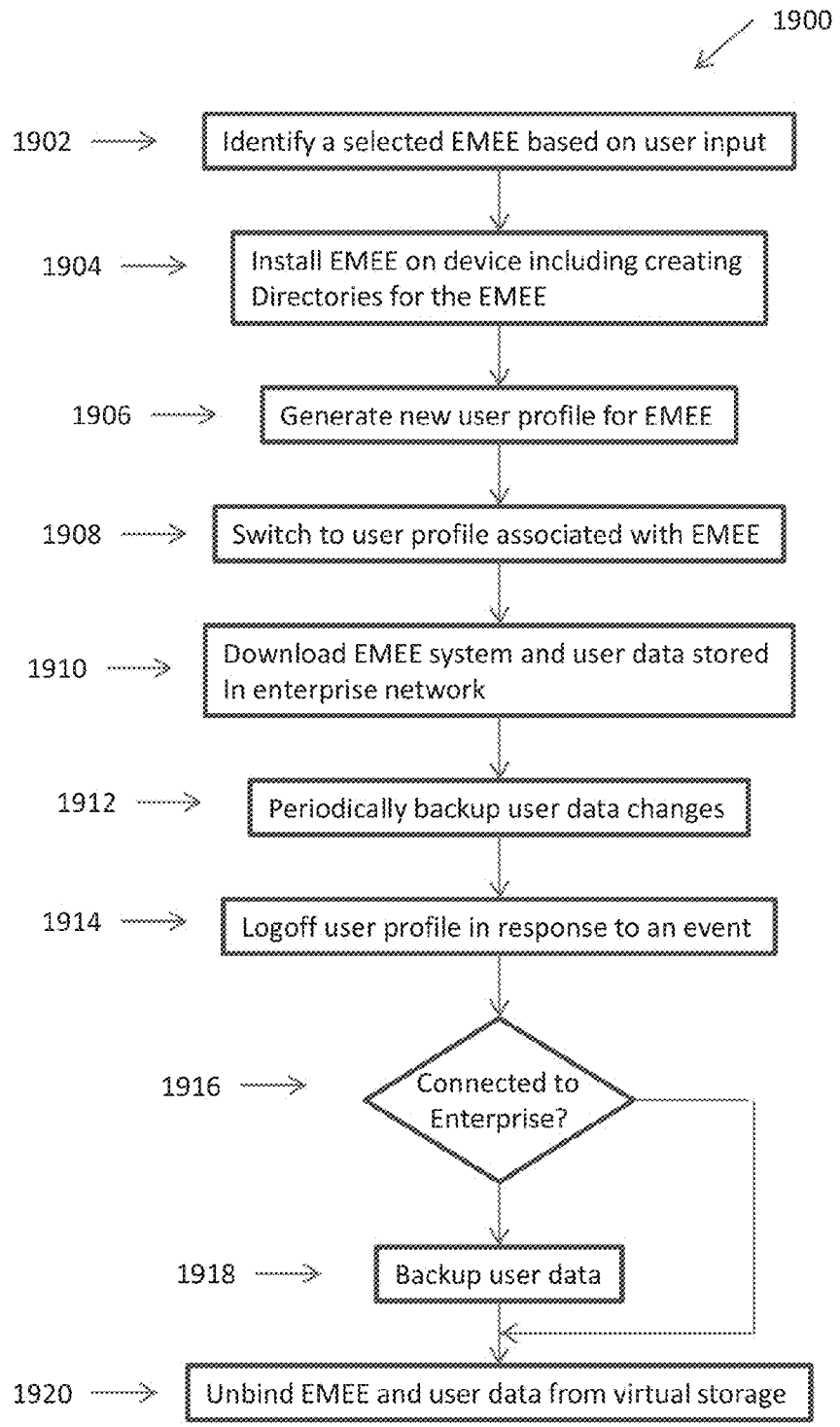
FIG. 18 is a flow chart illustrating an example method for managing an EMEE.

FIG. 18 is a flow chart illustrating an example method 1900 for managing an EMEE. Method 1900 a selected EMEE is identified based on user input. In some instances, information about the EMEE may be pre-configured on the VMDS Provider network or the information can be entered directly through VDM interface on the device. If pre-provisioned on the VMDS provider network, the user may be presented with a list of available EMEEs (same as in a case of standard MEE and TMEE). If not provisioned, the user may use a local GUI interface provided by the VDM to enter EMEE information. At step 1904, the user installs the EMEE on a device. The difference between an EMEE and an MEE/TMEE is that during this process the EMEE System is not downloaded; instead, the new empty directories are created for the EMEE and information about connectivity is stored on device (e.g., URL of EMEE repository, protocol to be used for connectivity). Next, at step 1906, the user creates a new user profile based on the EMEE. During this step, the empty directories are created for user data. The user switches to user profile associated with the EMEE using VDM GUI interface at step 1908. At step 1910, the VDM prompts the user with its credentials (e.g. user ID, password, security token). Next, at step 1910, the VDM interacts with the EME repository and downloads the EMEE system and user data that stored in the enterprise network. This data may be downloaded into a temporary storage on the device that may or may not be a persistent storage. After download is complete, the VDM may switch to new user profile by unbinding a previous system and data directories from an old user profile and binding the new user profile directories. The EMEE is available for user. At step 1912, the user data updates are periodically backed up to enterprise network. Next, at step 1914, an event triggers the user profile associated with the EMEE to be log off. These events may be based on security settings of the EMEE. The VDM, an application, or both may monitor for these events. An application inside the EMEE may have an interface with the VDM to trigger a logoff procedure. Example of events may include lost connectivity with enterprise, time expired, forced by enterprise, user selects to log of from enterprise, switch to another user profile, or others. If user data is not backup and the device is still has connectivity to an enterprise at decisional step 1916, at step 1918, the backup process started. The EMEE system is unbound from the virtual storage and be removed at step 1920. The user data may unbind form the virtual storage. The system and data directories for the next user profile binds to virtual storage, and the VDM restarts MEE.

A number of embodiments of the invention have been described. Nevertheless, it will be understood that various modifications may be made without departing from the spirit and scope of the invention. For example, the method claims may be analogous written as a computer program product using the following, "encoded on a tangible, non-transitory storage medium, the product comprising computer readable instructions for causing one or more processors to perform operations comprising." Accordingly, other embodiments are within the scope of the following claims.

What is claimed is:

1. A method, comprising:
   mounting, by computing device, a first directory or file system stored on a disk to a second directory, wherein mounting the first directory or the file system stored on the disk prevents access to information stored in the second directory; and
   opening, by a monitoring process started by an initialization process, a lock file using the second directory after the mounting, wherein the lock file is stored in the first directory or the file system, and the initialization process is configured to reboot the computing device when the monitoring process exits or is killed.

2. The method of claim 1, further comprising generating the lock file after mounting the first directory or file system.

3. The method of claim 1,
   prior to mounting the first directory, opening a secure file in the second directory, wherein the opened secure file is only accessible to the monitoring process after mounting the first directory;
   receiving, by the monitoring process, a request for information in the second directory; and
   retrieving, by the monitoring process, the information from the opened secure file.

4. The method of claim 1, further comprising:
   prior to mounting the first directory, opening a secure file in the second directory;
   storing information from the secure file to runtime memory of the monitoring process;
   closing the secure file prior to the mounting process;
   receiving, by the monitoring process, a request for information in the second directory; and
   retrieving, by the monitoring process, the information from the runtime memory.

5. The method of claim 1, further comprising:
   unmounting the first directory or file system stored on the disk from the second directory;
   reading data from a secure file in the second directory; and
   mounting again the first directory or file system stored on the disk from the second directory.

6. The method of claim 1, comprising:
   receiving a request to grant access to an application included in the first directory to a second user; and
   copying or linking files or directories for the application in the first directory to the second user directory associated with the second user.

7. The method of claim 1, wherein a first mobile execution environment associated with a first user, and a second mobile execution environment is associated with a second user different from the first user.

8. A computer program product encoded on a non-transitory medium, the product comprising computer readable instructions for causing one or more processors to perform operations comprising:
   mounting, by a computing device, a first directory or file system stored on a disk to a second directory, wherein mounting the first directory or the file system stored on the disk prevents access to information stored in the second directory; and
   opening, by a monitoring process started by an initialization process, a lock file using the second directory after the mounting, wherein the lock file is stored in the first directory or the file system, and the initialization process is configured to reboot the computing device when the monitoring process exits or is killed.

9. The computer program product of claim 8, the instructions further comprising generating the lock file after mounting the first directory or file system.

10. The computer program product of claim 8, the instructions further comprising:
   prior to mounting the first directory, opening a secure file in the second directory, wherein the opened secure file is only accessible to the monitoring process after mounting the first directory;
   receiving, by the monitoring process, a request for information in the second directory; and
   retrieving, by the monitoring process, the information from the opened secure file.

11. The computer program product of claim 8, the instructions further comprising:
   prior to mounting the first directory, opening a secure file in the second directory;
   storing information from the secure file to runtime memory of the monitoring process;
   closing the secure file prior to the mounting process;
   receiving, by the monitoring process, a request for information in the second directory; and
   retrieving, by the monitoring process, the information from the runtime memory.

12. The computer program product of claim 8, the instructions further comprising:
   unmounting the first directory or file system stored on the disk from the second directory;
   reading data from a secure file in the second directory; and
   mounting again the first directory or file system stored on the disk from the second directory.

13. The computer program product of claim 8, the instructions comprising:
   receiving a request to grant access to an application included in the first directory to a second user; and
   copying or linking files or directories for the application in the first directory to the second user directory associated with the second user.

14. The computer program product of claim 8, wherein a first mobile execution environment associated with a first user, and a second mobile execution environment is associated with a second user different from the first user.

15. A computing device, comprising:
   one or more processors configured to:
      mount a first directory or file system stored on a disk to a second directory, wherein mounting the first directory or the file system stored on the disk prevents access to information stored in the second directory; and
      open, by a monitoring process started by an initialization process, a lock file using the second directory after the mounting, wherein the lock file is stored in the first directory or the file system, and the initialization process is configured to reboot the computing device when the monitoring process exits or is killed.

16. The computing device of claim 15, the one or more processors further configured to generate the lock file after mounting the first directory or file system.

17. The computing device of claim 15, the one or more processors further configured to:
   prior to mounting the first directory, open a secure file in the second directory, wherein the opened secure file is only accessible to the monitoring process after mounting the first directory;
   receive, by the monitoring process, a request for information in the second directory; and
   retrieve, by the monitoring process, the information from the opened secure file.

18. The computing device of claim 15, the one or more processors further configured to:
   prior to mounting the first directory, open a secure file in the second directory;
   store information from the secure file to runtime memory of the monitoring process;
   close the secure file prior to the mounting process;
   receive, by the monitoring process, a request for information in the second directory; and
   retrieve, by the monitoring process, the information from the runtime memory.

19. The computing device of claim 15, the one or more processors further configured to:
   unmount the first directory or file system stored on the disk from the second directory;
   read data from a secure file in the second directory; and
   mount again the first directory or file system stored on the disk from the second directory.

20. The computing device of claim 15, the one or more processors further configured to:
   receive a request to grant access to an application included in the first directory to a second user; and
   copy or linking files or directories for the application in the first directory to the second user directory associated with the second user.

21. The computing device of claim 15, wherein a first mobile execution environment associated with a first user, and a second mobile execution environment is associated with a second user different from the first user.

* * * * *